(12) United States Patent
Wilson et al.

(10) Patent No.: US 11,096,337 B1
(45) Date of Patent: Aug. 24, 2021

(54) METHOD AND APPARATUS FOR A HEATING, VENTILATING, AND AIR CONDITIONING SYSTEM FOR INDOOR FARMING

(71) Applicant: ZEA Biosciences Corp, Walpole, MA (US)

(72) Inventors: James G Wilson, Medfield, MA (US); Gerald C. Antoine, Pembroke, MA (US); Robert A. Adams, North Easton, MA (US)

(73) Assignee: ZEA Biosciences Corp, Walpole, MA (US)

( * ) Notice: Subject to any disclaimer, the term of this patent is extended or adjusted under 35 U.S.C. 154(b) by 0 days.

(21) Appl. No.: 17/212,438

(22) Filed: Mar. 25, 2021

Related U.S. Application Data

(63) Continuation of application No. 16/445,153, filed on Jun. 18, 2019.

(60) Provisional application No. 62/686,193, filed on Jun. 18, 2018.

(51) Int. Cl.
*A01G 9/24* (2006.01)

(52) U.S. Cl.
CPC ............ *A01G 9/246* (2013.01); *A01G 9/249* (2019.05)

(58) Field of Classification Search
CPC .................................................... A01G 9/246
See application file for complete search history.

(56) References Cited

U.S. PATENT DOCUMENTS

| 2009/0044555 A1* | 2/2009 | Park | F24F 3/1423 |
| | | | 62/271 |
| 2017/0045242 A1* | 2/2017 | Lee | F24D 15/04 |

* cited by examiner

*Primary Examiner* — Jessica B Wong
(74) *Attorney, Agent, or Firm* — Arlene J. Powers

(57) ABSTRACT

An HVAC system used in a growing room to grow plants, including lighting and other heat producing pieces of equipment, wherein operating parameters are modified over time in response to and anticipation of changes in heat production by the lighting and other heat-producing pieces of equipment and moisture production from the plants and plant growing systems located in or near the growing room. The operating parameters of the system are modified during the growth cycle of the plants to provide environmental conditions appropriate to each phase of the plant growth. Additionally, the system comprises components carrying a load such that energy use can be reduced during times when less than maximum load is required. Algorithms and tables to control airflow, heating, cooling, dehumidification, and chemical composition of the air are included to maximize plant growth. $CO_2$ and other byproducts of heating, cooling, and cogeneration are recycled for use in connection with plant growth.

19 Claims, 1 Drawing Sheet

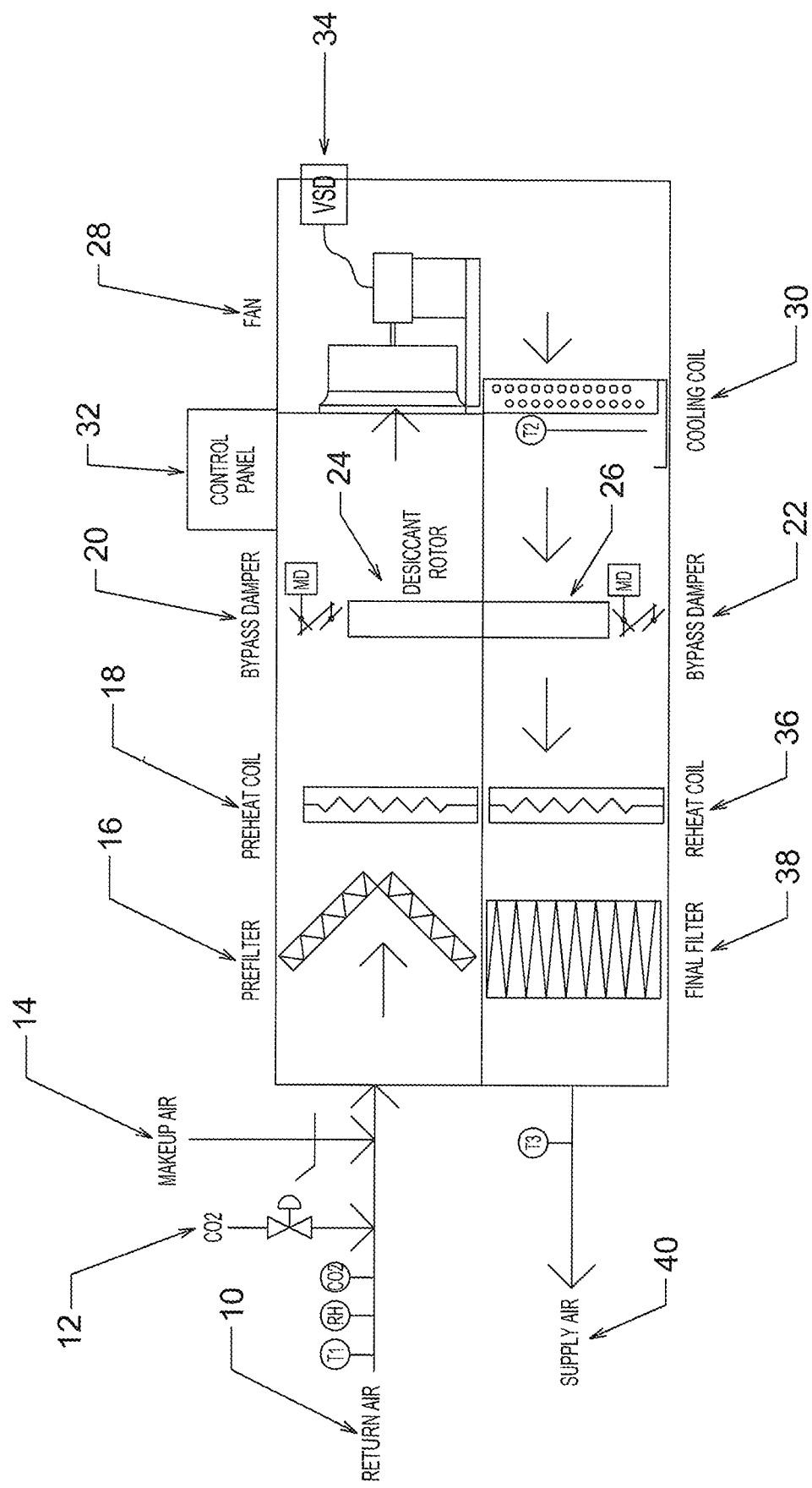

METHOD AND APPARATUS FOR A HEATING, VENTILATING, AND AIR CONDITIONING SYSTEM FOR INDOOR FARMING

CROSS REFERENCE TO RELATED APPLICATION

This application claims the benefit of U.S. provisional patent application entitled "METHOD AND APPARATUS FOR A HEATING, VENTILATING, AND AIR CONDITIONING SYSTEM FOR INDOOR FARMING" filed, Jun. 18, 2018 and assigned Ser. No. 62/686,193, and U.S. Ser. No. 16/445,153 filed Jun. 18, 2019 which are incorporated by reference in their entirety.

BACKGROUND OF THE INVENTION

1. Field of the Invention

The invention is directed to a specialized mechanical system that provides heating, ventilating, and air conditioning (HVAC) to achieve optimum plant grow room temperature, relative humidity, vapor pressure deficit, and $CO_2$ augmentation with minimum energy input.

2. Description of the Prior Art

Typically, indoor plant growth is an upcoming solution to safe and sustainable food, medicine, and plant-based chemical production. Greenhouses have been operating for centuries, but they have limitations due to seasonal lighting, outdoor environment changes, and materials of construction.

Closed indoor plant grow rooms are usable year-round, and with properly designed lighting, HVAC, and fertigation systems, plant growth can be optimized in a pure, clean, and pesticide and pathogen-free environment.

Conventional HVAC systems are designed for a specific latent and sensible heat load that is typical for human comfort, and do not adapt well to constantly changing plant growth conditions. The indoor lighting requires substantial cooling during the lights-on cycle, but little or no cooling in the dawn, dusk, or lights-off cycles. Plants give off increasing moisture from transpiration as they grow larger, and so in a closed environment they require more dehumidification from the HVAC system to maintain the optimum relative humidity and/or vapor pressure deficit for each stage of plant growth. This change in load often causes conventional HVAC systems to operate inefficiently and to struggle or fail to maintain the desired setpoints. In some cases, plant growth can be further optimized and/or accelerated by adding $CO_2$ and other gasses to the air inside the grow room. Some of these are byproducts or waste-products of current HVAC systems, but current systems do not recycle these gasses for use in plant growth.

SUMMARY OF THE INVENTION

An air handling unit (AHU) containing air filtration, a fan, a cooling coil, a desiccant wheel, a control damper, a heating coil, and control system components is programmed to supply air to a plant grow room to precisely match the changing cooling, heating, and dehumidification loads throughout the entire plant grow cycle. A controls algorithm calculates the optimum airflow, pre-heating, cooling, re-heating, and dehumidification settings that use the least amount of energy to maintain the grow room setpoints. The controls algorithm also contains a "look ahead" feature that quickly adapts to the lights on/lights off grow room state to prevent overshooting and undershooting of the room setpoints. The apparatus can be used for indoor growth of leafy green vegetables, herbs, *cannabis*, switchgrass, and other plant types where indoor growth is feasible or beneficial. In addition, various byproducts that are typically considered waste products of an HVAC energy system are recycled and mixed in with the air to help with plant growth.

The methods and systems described herein are used to produce an HVAC system that can adapt to the varying loads throughout the plant growth cycle. The components described herein are selected and arranged to modulate their output to efficiently maintain the precise air conditions that maximize plant growth. A controls algorithm adjusts the optimum setting for each component to minimize the energy used by the HVAC system. Byproducts of cogeneration, heating, air conditioning, ventilation and other processes are recycled into the air to produce an enhanced growing environment for plants.

BRIEF DESCRIPTION OF THE DRAWINGS

Other objects, features, and advantages of the present invention will become more apparent as the description proceeds with reference to the accompanying drawings, wherein: FIG. 1 illustrates a cross sectional schematic view of an apparatus that contains the components of one embodiment of a plant grow-room air handling system.

DETAILED DESCRIPTION OF THE INVENTION

This invention is described with particularity in the detailed description and claims. The above and further advantages of this invention may be better understood by referring to the following description in conjunction with the accompanying drawings, in which like numerals indicate like structural elements and features in various FIGURES. The drawings are not necessarily to scale, emphasis instead being placed upon illustrating the principles of the invention.

The air handler in one embodiment of a plant grow room HVAC system is installed in closed loop ductwork. Return air 10 from the grow room is mixed with $CO_2$ 12 and fresh air 14. The entering air passes through a prefilter array 16 and in some instances then passes through a preheat coil 18. At this point, the system has two modes of operation: sensible mode and latent mode.

In sensible mode, the upper and lower bypass dampers 20, 22 are open, thus allowing some of the air to bypass the desiccant rotor upper and lower chambers 24 and 26. The rotor drive motor is off, preventing any dehumidification contribution from the rotor. The air is drawn through the upper bypass damper and upper desiccant rotor chamber 24 into the fan 28, and then passes through the cooling coil 30 where it is cooled and dehumidified. The control system 32 adjusts the fan speed 34 and refrigeration output to the cooling coil to maintain the desired cooling coil leaving air conditions. The air then passes through the lower bypass damper 22 and lower desiccant rotor chamber 26, through the reheat coil 36, and through the final filters 38 into the supply air duct 40.

In latent mode, the bypass dampers 20 and 22 are closed and the full airstream passes through the desiccant rotor upper and lower chambers 24, 26. The rotor drive motor is on, enabling the full dehumidification contribution from the rotor. The air is drawn through the upper desiccant rotor chamber 24 into the fan 28, and then passes through the cooling coil 30 where it is cooled and dehumidified. The control system 32 adjusts the fan speed 34 and refrigeration output to the cooling coil to maintain the desired cooling coil leaving air conditions. The air then passes through lower desiccant rotor chamber 26, through the reheat coil 36, and through the final filters 38 into the supply air duct 40.

The mode of operation is dependent on the portion of latent (moisture) load vs the sensible (heat) load coming from the fans and lights. The plants via transpiration contribute both sensible cooling by evaporation and latent moisture load by the same evaporation. When the plants are small the quantity of moisture from transpiration is low, but the heat load from fans and lighting is constant. Thus, the sensible load must be removed by the HVAC system without over-dehumidifying the room. As the plants grow larger, they contribute both more moisture into the grow room from transpiration and more sensible cooling from evaporation. The HVAC system thus must remove the additional latent load and less sensible load.

Control algorithms and tables are programed into the computer to maximize efficiency of its operation in conjunction with conditions that will predictably change with periodic cycles of lighting and other variable in connection with plant growth to control airflow, pre-heating, cooling, dehumidification, re-heating, and chemical composition of the air to maximize plant growth. The controls algorithm also contains a "look ahead" feature that quickly adapts to the lights on/lights off grow room state to prevent overshooting and undershooting of the room setpoints.

The controls algorithm determines airflow, cooling coil, and heating coil setpoints necessary to maintain the room temperature and RH setpoints. By modulating the fan speed, cooling valve, and heating valve output to maintain the room conditions, no excess capacity is used when compared to on/off cooling and heating control.

The operating parameters are modified over time in anticipation of changes in heat production by lighting and other heat-producing items that may be found near the growing rooms. The control system "memorizes" the last settings of the AHU components at the point where the lights cycle on or off. At the changeover point, all control device settings revert to the previous settings to prevent "hunting" of control outputs.

The system determines which mode to use by having the fan speed, cooling, and heating modulated to maintain their respective setpoints. The bypass dampers are closed, and the desiccant rotor is turned on when the latent load increases to the point where it is needed to maintain the RH/VPD setpoints.

The HVAC system uses specialized sensors to monitor airflow, temperature, humidity, vapor pressure deficit, $CO_2$ level, and other variables that are relevant to plant growth. The sensors are distributed throughout the growing room to optimize the collection of data for input into the algorithm that controls the HVAC system. The HVAC system recycles $CO_2$ and other byproducts of heating, cooling, and cogeneration for use in connection with plant growth.

The system is more energy efficient and thus has a lower operating cost than current systems on the market. For dehumidification, the cooling tonnage required is substantially less than conventional refrigeration-only based systems.

Although the present invention has been shown and described with respect to several preferred embodiments thereof, various changes, omissions and additions to the form and detail thereof, may be made therein, without departing from the spirit and scope of the invention.

What is claimed is:

1. An air handling unit, said unit comprising:
   a prefilter;
   a desiccant rotor in parallel with bypass dampers;
   a fan;
   a cooling coil;
   a reheat coil; and
   a final filter,
   wherein the fan pulls return air from a grow room that is monitored with sensors to measure airflow, temperature, humidity, vapor pressure deficit and CO2 into the air handling unit,
   whereupon the air flows through the prefilter, and through the desiccant rotor and one of the bypass dampers, wherein the bypass damper opens and closes based on the monitored sensor values,
   then the air passes through the cooling coil, then through the other bypass damper, and then through the reheat coil and final filter before reentering the grow room.

2. The air handling unit of claim 1, which further comprises a preheat coil after the prefilter.

3. The air handling unit of claim 1, incorporates control algorithms and tables to regulate airflow, pre-heating, cooling, dehumidification, re-heating, and chemical composition of the air to optimize plant growth in the grow room.

4. The air handling unit of claim 3, wherein the sensors are distributed throughout the grow room to collect room condition data for input into the algorithm that controls the air handling unit.

5. The air handling unit of claim 4, wherein the grow room has lighting and other heat producing pieces of equipment therein and plants at differing stages of growth, such that operating parameters of the air handling unit are modified over time in response to or anticipation of changes in heat production by lighting and other heat-producing pieces of equipment and moisture produced by the plants.

6. The air handling system of claim 5, wherein the plants in the grow room have a growth cycle, the air handling unit having operating parameters which are modified during the growth cycle of the plants to provide environmental conditions appropriate to each phase of plant growth.

7. The air handling system of claim 5, comprising components used to remove sensible and latent heat loads, wherein the components may be operated to reduce energy use during times when less than maximum load is required.

8. The air handling system of claim 5, wherein as the plants in the grow room are at a growth stage where moisture production is minimal, the bypass damper is open and the desiccant rotor is disabled.

9. The air handling system of claim 5, wherein as the plants in the grow room are at a growth stage where moisture production is substantial, the bypass damper is closed and the desiccant rotor is enabled.

10. A method of cooling and dehumidifying air from a grow room having plants therein, comprising the sets of:
    drawing return air from the grow room with a fan in an air handling system;
    monitoring the air with sensors to measure airflow, temperature, humidity, vapor pressure deficit and CO2;
    drawing the air through a prefilter;
    incorporating control algorithms and tables to regulate airflow, pre-heating, cooling, dehumidification, re-heating, and chemical composition of the air to maximize growth of said plants;

providing a combination of a desiccant rotor in parallel with a bypass damper such that the bypass damper opens and closes to regulate the portion of the air passing through the desiccant rotor;

utilizing the information from the algorithms and tables to enable and disable the desiccant rotor;

drawing the air through the desiccant rotor and bypass damper into the fan;

blowing the air through a cooling coil;

blowing the air through another bypass damper and the desiccant rotor;

blowing the air through a reheat coil;

blowing the air through final filters; and supplying the air into the grow room.

11. The method of claim 10, further comprising moving the air over a preheat coil after it moves through the prefilter.

12. The method of claim 10, further comprising distributing the sensors throughout the grow room to enable collection of data for input into the algorithms.

13. The method of claim 10, modifying operating parameters of the air handling unit over time in response to or anticipation of changes in heat production by lighting and other heat-producing pieces of equipment and moisture production from the plants at varying growth stages in the grow room.

14. The method of claim 12, further comprising modifying the operating parameters of the air handling unit during the growth cycle of the plants in the grow room to provide environmental conditions appropriate to each phase of plant growth.

15. The method of claim 12, further comprising operating the components used to remove the sensible and latent heat loads to reduce energy use during times when less than maximum capacities are required.

16. The method of claim 15, further comprising increasing the airflow through the air handling system wherein the increased airflow through the cooling coil results in less moisture removal and more sensible heat removal of the airstream.

17. The method of claim 12, further comprising closing the bypass damper and enabling the desiccant rotor wherein the plants in the grow room are larger and are producing substantial moisture.

18. The method of claim 12, further comprising reducing the airflow through the air handling system wherein the reduced airflow through the cooling coil results in more moisture removal and less sensible heat removal of the airstream wherein the plants in the grow room are larger and are producing substantial moisture.

19. The method of claim 18, further comprising opening the bypass damper and disabling the rotor rotation when the plants in the grow room are smaller and produce less moisture load.

* * * * *